(12) United States Patent
Bez et al.

(10) Patent No.: US 7,036,792 B2
(45) Date of Patent: May 2, 2006

(54) VALVE ARRANGEMENT FOR A VACUUM PUMP

(75) Inventors: Eckhard Bez, New Bern, NC (US); Stefan Zabeschek, Asslar (DE)

(73) Assignee: Pfeiffer Vacuum GmbH, Asslar (DE)

( * ) Notice: Subject to any disclaimer, the term of this patent is extended or adjusted under 35 U.S.C. 154(b) by 120 days.

(21) Appl. No.: 10/671,072

(22) Filed: Sep. 24, 2003

(65) Prior Publication Data

US 2004/0056228 A1   Mar. 25, 2004

(30) Foreign Application Priority Data

Sep. 25, 2002   (DE)   ............... 102 44 526

(51) Int. Cl.
*F16K 25/00*   (2006.01)

(52) U.S. Cl. .............. 251/174; 251/172; 251/321; 251/339

(58) Field of Classification Search ........ 251/170–172, 251/174, 321, 337, 339
See application file for complete search history.

(56) References Cited

U.S. PATENT DOCUMENTS

| | | | | |
|---|---|---|---|---|
| 3,972,507 A | * | 8/1976 | Grove | ............... 251/172 |
| 4,102,608 A | | 7/1978 | Balkau et al. | |
| 4,364,544 A | * | 12/1982 | Kim | ............... 251/172 |
| 4,699,572 A | | 10/1987 | Balkau et al. | |
| 4,962,881 A | * | 10/1990 | Otsuki et al. | ............... 251/149.7 |
| 5,163,655 A | * | 11/1992 | Chickering et al. | ............... 251/174 |

FOREIGN PATENT DOCUMENTS

| | | |
|---|---|---|
| DE | 1112359 | 4/1959 |
| DE | 9634518 | 3/1998 |
| DE | 9721356 | 12/1998 |
| FR | 2655535 | 6/1991 |

OTHER PUBLICATIONS

Search Report.

* cited by examiner

*Primary Examiner*—Tuan Nguyen
(74) *Attorney, Agent, or Firm*—Abelman, Frayne & Schwab

(57) ABSTRACT

A valve arrangement for a vacuum pump includes a valve head displaceable substantially perpendicular to a flow direction of a fluid through the valve arrangement, a valve seat, and a valve spring for biasing the valve head into a flat abutment engagement with the valve seat, with the valve spring being formed of at least one substantially hollow body made of an elastomeric material.

10 Claims, 4 Drawing Sheets

VALVE ARRANGEMENT FOR A VACUUM PUMP

BACKGROUND OF THE INVENTION

1. Field of the Invention

The present invention relates to a valve arrangement for a vacuum pump and including a valve head displaceable substantially perpendicular to a flow direction of fluid through the valve arrangement, a valve seat, and a valve spring for biasing the valve head into an abutment engagement with the valve seat.

2. Description of the Prior Art

A valve arrangement of the type described above is used primarily in vacuum pumps which are characterized by a dry operation in the compression chamber. The vacuum pumps with a dry operation in the compression chamber necessitate use of lubricant-free components, e.g., valves which are directly connected with the pumps.

Generally, in valves used with the above described type of vacuum pumps, the closing elements which, as a rule, is called a valve head, is displaced in the flow direction. In the closed condition, the valve head flatly abuts a valve seat and is biased to its closing position by a spring. There exist different designs of valve springs used in valves for vacuum pumps with a dry operation in the compression chamber. One of such springs is disclosed in U.S. Pat. No. 4,790,726. However, all of the known design have serious drawbacks. With metallic springs contacting non-lubricated surfaces, which is the case in vacuum pumps with a dry operation in the compression chamber, the wear of the cooperating elements can lead to their malfunction.

It was also proposed to use, as a valve spring, a massive O-ring in valves for lubricant-free pumps. However, such an O-ring is characterized by a poor springing action. A primary reason of a poor springing action of an O-ring consists in that its material in the center of the ring can be deformed only with much difficulty, and a very large force needs to be applied to effect deformation. In addition, a deformable O-ring has a cross-section that is determined by two opposite surfaces associated with respective cylindrical half-shells. This results in a non-linear springing action and in a very small deformation range.

It was also proposed to use spring elements formed of metal but covered with an elastic jacket. Such spring elements are very expensive in production.

Accordingly, an object of the present invention is to provide a valve arrangement in which the above-discussed drawbacks of known valve springs are eliminated. Another object of the present invention is to provide a valve arrangement with such valve springs that would insure a varied application of the valve arrangement, in particular, for operation in vacuum.

SUMMARY OF THE INVENTION

These and other objects of the present invention, which will become apparent hereinafter, are achieved forming the valve spring of at least one substantially hollow body made of an elastomeric material.

The advantage of the valve spring according to the present invention consists in that it eliminates wear associated with the use of metallic components. The different shapes of the hollow body ensure much better springing action than a solid body O-spring. The deformation range of the hollow body according to the present invention is also much greater than that of a solid body O-ring. On the other hand, less force is required for its deformation. The hollow body can be formed of different elastomeric materials having different elasticities which are widely available on the market. Also, the geometrical dimensions such as the diameter, wall thickness, length can be varied without any problem, which permits to easily adapt spring constants, e.g., stiffness, for different requirements. When the range of the springing action is so reduced that the inner diameter is extremely small but is not zero, no fatigue occurs, and the service life is almost unlimited. With a plurality of windings (concentric rings or a spiral), the spring force can be substantially increased. With the use of segments, it is possible to lower the force to a very small amount.

The novel features of the present invention, which are considered as characteristic for the invention, are set forth in the appended claims. The invention itself, however both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1A:
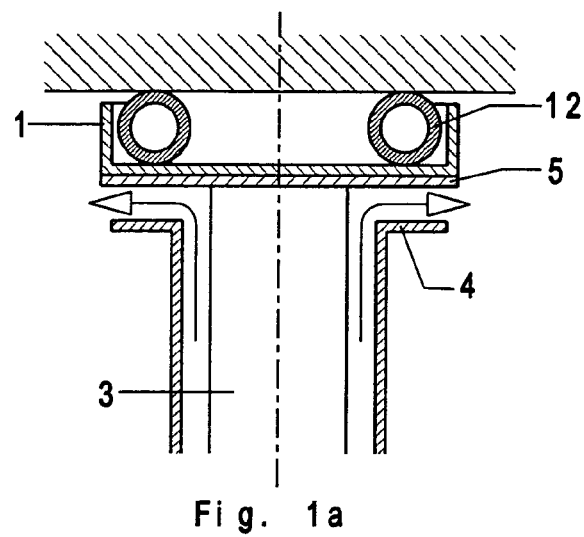
FIG. 1a a vertical cross-sectional view of a first embodiment of a valve arrangement for a vacuum pump according to the present invention.
Figure 1B:
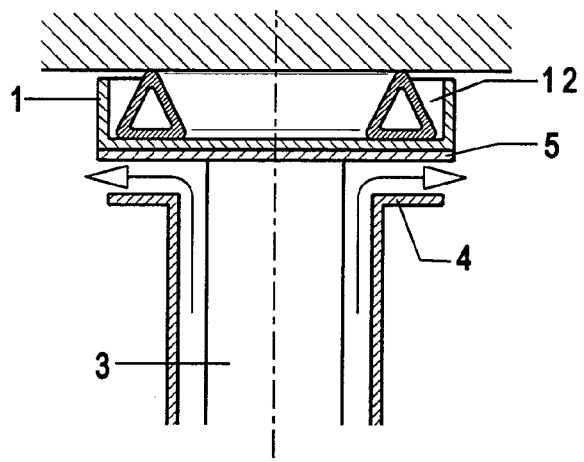
FIG. 1b a vertical cross-sectional view of a second embodiment of a valve arrangement for a vacuum pump according to the present invention.
Figure 1C:
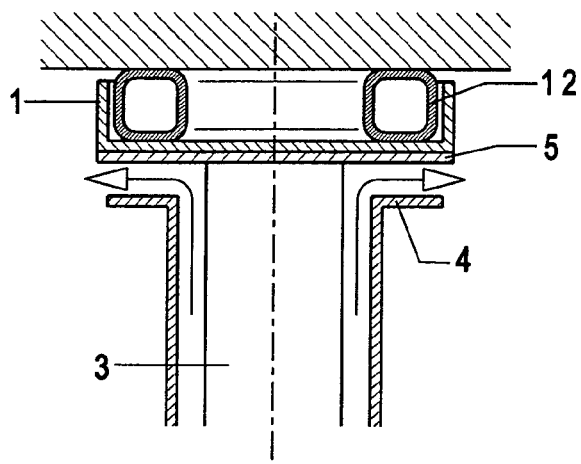
FIG. 1c a vertical cross-sectional view of a third embodiment of a valve arrangement for a vacuum pump according to the present invention.

Valve arrangements according to the present invention, which are shown in FIGS. 1a–1c, include essentially a valve head 1, a valve head support 3, a valve seat 4, and a valve spring 12. The valve head 1 is displaced perpendicular to the flow direction which is shown with arrows. In a closed condition of the valve arrangement, the valve head 1 lies flatly on the valve seat 4. The abutment of the valve head 1 with the valve seat 4 is insured by the valve spring 4 according to the present invention. To provide for an appropriate sealing, the valve head 1 is provided, on its side adjacent to the valve seat 4, with a flat sealing member 5. The sealing member 5 can be formed, e.g., by an appropriate coating.

Figure 2:
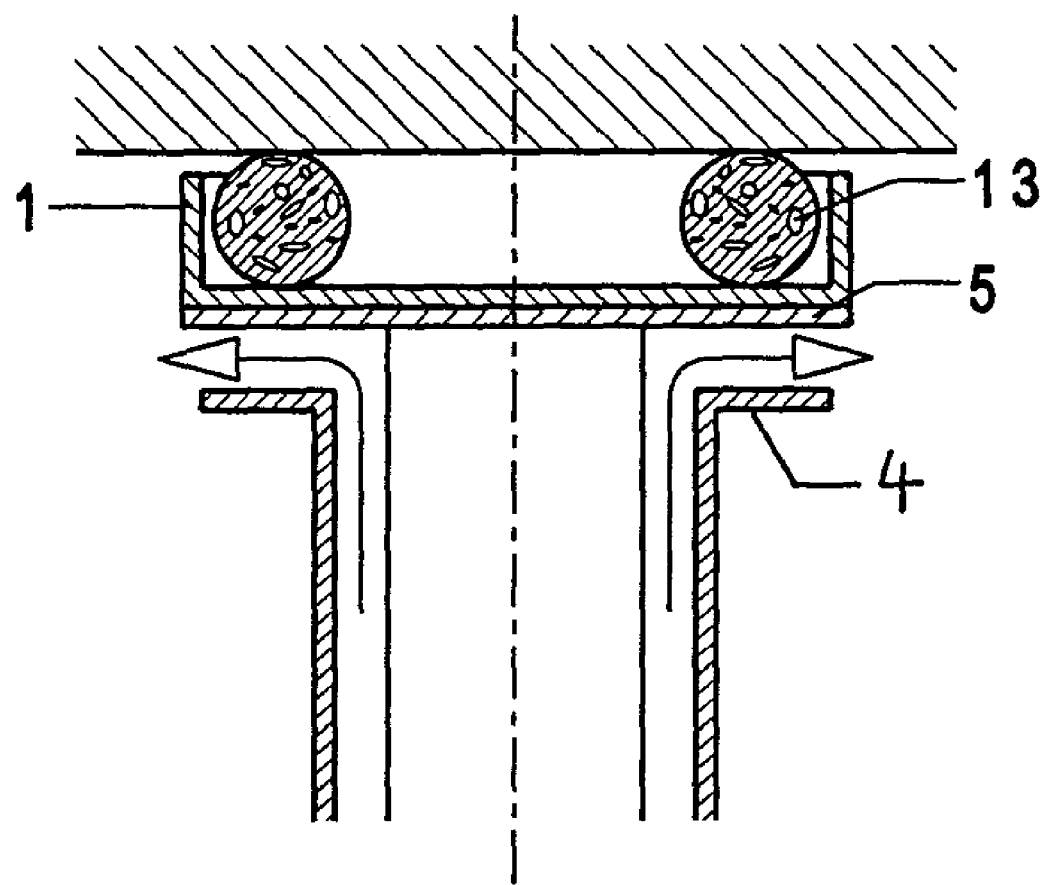
FIG. 2 a vertical cross-sectional view of a fourth embodiment of a valve arrangement for a vacuum pump according to the present invention.

According to the present invention, the valve spring 12 is formed as a hollow body, e.g., in form of a section of a tube having different cross-sections. In the embodiment shown in FIGS. 1a, 1b, 1c, the hollow body has, respectively, a circular cross-section, a triangular cross-section, a rectangular, square cross-section. Alternatively, the valve spring can be formed, as shown in FIG. 2, as a porous body 13 having, e.g., a circular cross-section.

Figure 3:
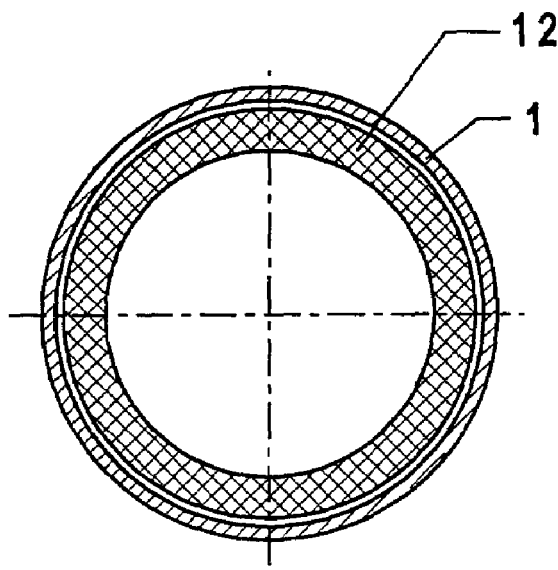
FIG. 3 a horizontal cross-sectional view of a further embodiment of a valve arrangement for a vacuum pump according to the present invention.
Figure 4:
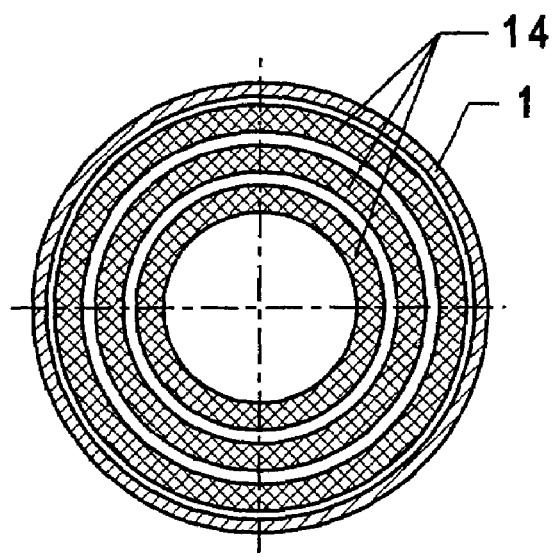
FIG. 4. a horizontal cross-sectional view of a still further embodiment of a valve arrangement for a vacuum pump according to the present invention.
Figure 5:
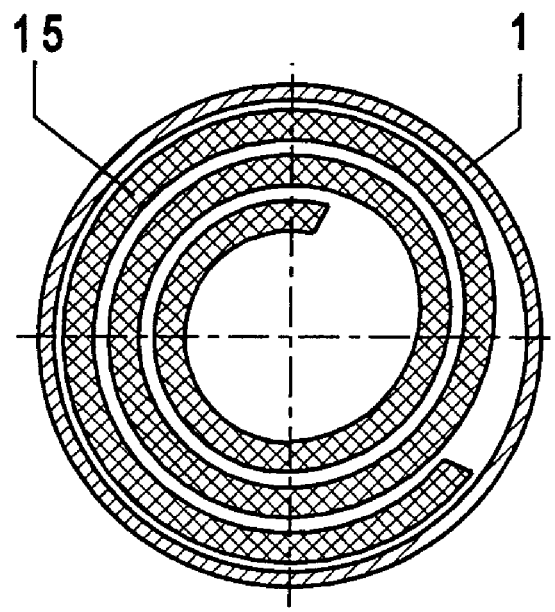
FIG. 5 a horizontal cross-sectional view of another embodiment of a valve arrangement for a vacuum pump according to the present invention.
Figure 6:
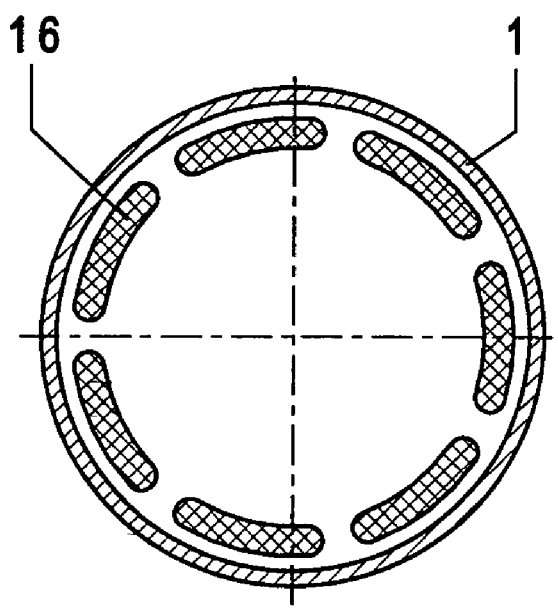
FIG. 6 a horizontal cross-sectional horizontal view of a yet another embodiment of a valve arrangement for a vacuum pump according to the present invention.

The valve spring 12 can also be formed as an annular body (FIG. 3), of a plurality of concentric rings 14 (FIG. 4), in form of a spiral 15 (FIG. 5), and be formed of a plurality of segment elements 1b (FIG. 6).

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A valve arrangement, comprising a valve head displaceable substantially perpendicular to a flow direction of fluid through the valve arrangement; a valve seat, the valve head flatly abutting the valve seat in a closed condition of the valve arrangement; and a valve spring for biasing the valve head into a flat abutment engagement with the valve seat, the valve spring being formed of at least one substantially hollow body made of an elastomeric material.

2. A valve arrangement according to claim 1, wherein the hollow body is formed by a tube.

3. A valve arrangement according to claim 1, wherein the hollow body has a circular cross-section.

4. A valve arrangement according to claim 1, wherein the hollow body has a rectangular cross-section.

5. A valve arrangement according to claim 1, wherein the hollow body is formed of a plurality of concentric elements.

6. A valve arrangement according to claim 1, wherein the hollow body is formed as a spiral.

7. A valve arrangement according to claim 1, wherein the hollow body is formed of a plurality of segments.

8. A valve arrangement according to claim 1, wherein the hollow body is formed of a porous structure.

9. A valve arrangement according to claim 1, wherein the valve head is provided with a continuous flat sealing member.

10. A valve arrangement according to claim 9, wherein the sealing member is formed by a coating deposited on a side of the valve head adjacent to the valve seat.

* * * * *